United States Patent [19]
Borschert et al.

[11] Patent Number: 6,026,338
[45] Date of Patent: Feb. 15, 2000

[54] SYSTEM TO CONTROL A CHASSIS VIBRATION DAMPING DEVICE

[75] Inventors: Udo Borschert, Sennfeld; Thomas Kutsche, Schweinfurt, both of Germany

[73] Assignee: Fichtel & Sachs AG, Schweinfurt, Germany

[21] Appl. No.: 08/738,992

[22] Filed: Oct. 24, 1996

[30]      Foreign Application Priority Data

Oct. 25, 1995 [DE] Germany .................. 195 39 566

[51] Int. Cl.$^7$ ............................................. B60G 21/00
[52] U.S. Cl. ...................... 701/37; 280/5.507; 701/38
[58] Field of Search .................. 701/37, 38; 280/5.5, 280/5.504, 5.506, 5.507, 5.51, 5.515, 5.519; 702/141, 151, 152

[56]              References Cited

U.S. PATENT DOCUMENTS

| 5,193,845 | 3/1993 | Yokote et al. | 280/707 |
| 5,441,300 | 8/1995 | Yokota et al. | 280/735 |
| 5,485,417 | 1/1996 | Wolf et al. | 364/424.01 |

FOREIGN PATENT DOCUMENTS

| 0236947 | 9/1987 | European Pat. Off. . |
| 0249209 | 12/1987 | European Pat. Off. . |
| 2674304 | 9/1992 | France . |
| 2680139 | 2/1993 | France . |
| 4117673 | 12/1991 | Germany . |
| 4138831 | 6/1992 | Germany . |
| 4201146 | 7/1992 | Germany . |
| 4130090 | 9/1992 | Germany . |
| 3282371 | 12/1991 | Japan . |
| 4065677 | 3/1992 | Japan . |
| 6032127 | 2/1994 | Japan . |
| 2253460 | 9/1992 | United Kingdom . |
| 2289111 | 11/1995 | United Kingdom . |

*Primary Examiner*—Michael Zanelli
*Attorney, Agent, or Firm*—Nils H. Ljungman & Associates

[57]            ABSTRACT

A system to control a chassis vibration damping device with a variable damping characteristic in a vehicle with the use of a single acceleration sensor and a subsequent processing of the signal by means of filters and of an additional signal of a primary detector, whereby the processing corresponds to a breakdown of the acceleration signal into its individual components which relate to the longitudinal, transverse and vertical axes of the vehicle.

18 Claims, 3 Drawing Sheets

SYSTEM TO CONTROL A CHASSIS VIBRATION DAMPING DEVICE

CROSS REFERENCE TO A RELATED APPLICATION

This Application is related to a co-pending application which has applicants in common with the present Application. The related co-pending application is Ser. No. 08/430,566, filed Apr. 28, 1995, issued as U.S. Pat. No. 5,721,681 on Feb. 24, 1998, entitled "Arrangement for control of a Chassis Vibration Damping Device", which is hereby incorporated by reference.

BACKGROUND OF THE INVENTION

1. Field of the Invention

The present invention generally relates to a system to control a chassis vibration damping device in a vehicle.

2. Background Information

To make it possible to more effectively adjust the vibration damping characteristics of a motor vehicle chassis to the conditions under which the vehicle is being driven or to the condition of the road, known devices modify the damping force characteristic of individual vibration dampers, or of all the vibration dampers, of the chassis. German Patent Number DE-A-41 36 224 (which is equivalent to British published application number GB-OS 2 253 460 A), for example, uses a number of sensors to measure or to calculate operating parameters of the motor vehicle which are representative of the instantaneous damping force demand. The damping force demand variables determined in real time are converted on the basis of vehicle-specific evaluation functions into a number of control variables, the sum of which is representative of the damping force characteristic to be set in the vibration dampers.

Specifically, in the known damping force control system, the damping force characteristic is selected as a function of the instantaneous values of the transverse acceleration, the transverse jerk, the thrust (longitudinal force), the change in thrust, the frequency-weighted superstructure acceleration and the frequency-weighted wheel acceleration.

The damping force characteristic refers to a relationship between the damping force produced by the damper as a function of the velocity of the damper compression and/or extension. The damping force characteristic can be shifted in several stages or can be adjusted continuously, for example between a "hard" damping force characteristic with a high damping force which changes comparatively sharply as a function of the damper velocity, through a "medium" damping force characteristic into a "soft" damping force characteristic, in which the damping force is on a lower level and changes less sharply as a function of the damper velocity. To prevent an excessively frequent shifting between the different damping force characteristics, there is a hysteresis device which delays the shifting of the characteristic from "hard" to "soft", but not from "soft" to "hard".

In the known damper control system, a plurality of sensors are necessary to measure the information which relates to the vehicle movement in the three spatial axes or the three axes of movement of the vehicle—the longitudinal axis, the transverse axis and the vertical axis—by means of corresponding acceleration sensors, and/or from measurement signals provided by substitute or auxiliary sensors which measure the steering angle, the vehicle speed, the angle of the throttle plate, the engine speed, the brake pressure etc.

German Patent No. 41 30 090 discloses a method for the automatic determination of the correspondence between directionally-related sensors and the directions of movement of a vehicle, whereby the output signals are transmitted to an evaluation unit. The two sensors are orthogonal to one another and, if possible, are parallel to one direction of vehicle movement.

OBJECT OF THE INVENTION

The object of the present invention is to create a system for the control of a chassis vibration damping device with a variable damping characteristic in a vehicle, in particular a motor vehicle, which system can function with fewer sensors to determine the acceleration variables of the vehicle than are required by known similar systems.

SUMMARY OF THE INVENTION

The present invention teaches that this object can be accomplished in a system or apparatus for the control of a chassis vibration damping device with a variable damping characteristic in a vehicle, comprising: an axis of movement x which runs in the longitudinal direction of the vehicle, an axis of movement y which runs in the transverse direction of the vehicle, and an axis of movement z which runs in the vertical direction of the vehicle, a measurement device which comprises an acceleration sensor, an evaluation device which determines a chassis demand variable as a function of the instantaneous value measured, and an actuator which can set the characteristic of the chassis device as a function of the chassis demand or requirement variable determined, characterized by the fact that the acceleration sensor on the vehicle is located with its measurement plane at an angle $\beta, \gamma$ to the axes of movement, and provides an instantaneous value of the vehicle acceleration in terms of magnitude and vectoral direction, that the evaluation device comprises signal separation means which are located in the signal path of the measurement signal and which respond selectively to a natural oscillation frequency of the first axis of movement z, which signal separation means separate the measurement signal into a measurement signal component $b_z$ which represents the instantaneous value of the acceleration variable in the direction of one of the first axes of movement z, and a measurement signal component $b_{xy}$ in a vehicle plane spanned by the longitudinal axis and the transverse axis of the vehicle, that from a primary detector there is an additional signal $\phi$ which is independent of the acceleration sensor, and which describes a vectoral direction of the vehicle movement, that the signal which describes the vectoral direction is transmitted to the evaluation device, so that the measurement signal component $b_{xy}$ is present in the form of a vector, that at the end of a vector analysis of the measurement signal component $b_{xy}$, the measurement signal components $b_x$; $b_y$ are available, that the evaluation device comprises the evaluation means corresponding to the measurement signal components $b_x$; $b_y$; $b_z$, which evaluation means generate demand components nx; ny; nz of the vehicle demand variable as a function of the measurement signal components $b_x$; $b_y$; $b_z$, that the evaluation device comprises summation means which sum the demand components $n_x$; $n_y$; $n_z$ to form a control signal which defines the chassis damping characteristic.

In such a system, the movement sensor measures the acceleration component in the direction of the axes of movement in the form of a total or composite signal. The natural frequencies which occur specifically in the direction of the first axis of movement make possible a frequencyselective separation of the measurement signal components which are representative of this axis of movement. This first measurement signal component which can be separated on account of the natural frequency behavior can be eliminated from the measurement signal supplied by the acceleration sensor, and the remaining signal can therefore be considered to correspond to a projection of the plane of the vehicle.

Using a second further signal from a primary or auxiliary detector, the remaining signal is broken down into components with reference to the two axes of the vehicle in the plane of the vehicle. Consideration must be given to the fact that the measurement signal which is processed from the acceleration signal is not unambiguous. For example, the acceleration signal output while the vehicle is accelerating through a right-hand curve can be identical to the signal output while the vehicle is decelerating through a left-hand curve. The additional signal provides the basis on which it is possible to make this important distinction between such cases.

In spite of the single acceleration sensor, it is thereby possible to evaluate a plurality of measurement signal components which correspond to specific axes of movement separately from one another for the determination of the chassis setting. The evaluation means which are provided for this purpose, which can be characteristic memories or table memories or similar types of memory devices, supply evaluation functions which can be optimized separately from one another for each of the above-mentioned components of the measurement signal. The evaluation functions can be determined, for example, from the point of view of vehicle handling and comfort on the basis of practical road tests.

As a rule the handling of the vehicle takes priority over the comfort, because handling often parallels the degree of safety with which the vehicle can be operated.

One explanation of the invention, takes the perspective that the accelerometer has a measurement plane, which plane has the shape of a rectangle. Adjacent sides of the rectangle represent two directions in which the accelerometer can measure, which resulting measurement is a composite of the two directions. Alternatively, the accelerometer can be viewed as measuring acceleration along a particular direction or vector. So that the vector represents two directions, when comparing the vector to the rectangular plane, the vector essentially connects opposite corners of the rectangular plane. If the horizontal plane of a vehicle is represented by the X and Y axes of a rectangular planar coordinate system, the accelerometer can measure both the X and Y components of acceleration as a composite measurement, if the sides of the measurement plane of the accelerometer are essentially aligned with the X and Y axes or if the vector of the accelerometer intersects the coordinate system between the X and Y axes. It is desirable to also measure the acceleration in the vertical direction of a vehicle, which can be represented by the Z axis which is perpendicular to the XY plane (horizontal plane). Acceleration in the direction of the Z axis, a third dimension, can be measured as a composite with the X and Y acceleration directions by angling the measurement plane or vector of the accelerometer out of the XY plane. Thus, the signal from a single accelerometer can represent a vector sum of the accelerations in the X, Y, and Z directions.

The decomposition of the single acceleration vector signal is an important part of the present invention. If the Z axis component of acceleration can be subtracted from the composite signal, the remainder of the signal represents the acceleration in the X and Y axes, or the remainder can be viewed as the projection of the composite vector on the XY plane (horizontal plane). Further decomposition of the remainder then results in accelerations in the X and Y axis directions.

In one advantageous embodiment, the signal separation means for the separation of the first measurement signal component from the measurement signal of the acceleration sensor comprise a filter which is tuned to the natural oscillation frequency, and subtraction means to form the second measurement signal component, which subtraction means subtract each first measurement signal component from the measurement signal. The circuitry required to achieve such signal separation means is comparatively small, simple and inexpensive. For example, to eliminate interference caused by undesirable natural frequencies from the measurement signal of the acceleration sensor, a low pass filter can be connected upstream of the signal separation means, which low pass filter allows the desired signal components to pass, but blocks the undesirable components of the signal. For example, in embodiments in which the signal separation means comprise a band pass filter tuned with its center frequency to the natural vibration frequency of a vehicle superstructure, it may be appropriate to set the cutoff frequency of the low pass filter so that the filter allows the natural vibration frequency of the vehicle superstructure to pass, but blocks the natural vibration frequency of the vehicle wheels.

In another advantageous embodiment, the additional primary detector is realized in the form of the steering angle switch. The steering angle switch, in contrast to the steering angle sensor, has the advantage that the number of rotations of the steering wheel need not be measured. In practical terms, the steering angle switch supplies a signal of the type 0 or 1. The same is true for a primary detector which is formed by a brake switch. There is already a brake switch in every vehicle for the brake light. Consequently, there is no need for additional equipment. In one particularly advantageous embodiment, an additional primary detector is used in the form of a speedometer or tachometer in connection with a differentiation element. There has to be a speedometer or tachometer in the vehicle in any case. Every computer, moreover, contains a timer element which is used to control its operating steps, which timer element can perform the differentiation function.

The chassis control system claimed by the present invention can be used in "active" chassis devices in which the damping force of the vibration dampers is modified by the controlled establishment in the vibration dampers of a fluid pressure which differs from the pressure supplied by an external source of hydraulic fluid. But the damping control system can also be used in "adaptive" vibration dampers, in which, for example, the vibration damper or dampers of the chassis are controlled by influencing the degree of opening of damper valves, or by opening and closing damper valves in a parallel or series connection, to change the damping resistance, or by changing the damping properties of the damping fluid. In both versions, valves are switched to modify the damping force characteristic.

Of course, it is also possible to use the system on a chassis with adjustable stabilizers. To prevent an excessively frequent shifting of the damping force characteristic and thus excessive wear of the mechanical components, the present invention teaches that in one preferred embodiment, the evaluation device to limit the frequency with which the damping force characteristic can be modified is provided with a hysteresis device which delays a modification of the damping force characteristic in at least one of two directions of modification which are opposite to one another. In particular, the delay is executed exclusively when there is a change from a harder damping force characteristic to a softer damping force characteristic. The change of the damping force characteristic to a "harder" characteristic, which is relevant in terms of vehicle handling, thereby occurs immediately, while the return to the softer characteristic, which increases the ride comfort, is delayed. It goes without saying that in addition to the temporal or time related hysteresis, various other hysteresis thresholds can be provided for a quantitative hysteresis. So that the hysteresis characteristics can be better adapted to the vehicle parameters, the present invention teaches that it is appropriate for the hysteresis device to have hysteresis means which correspond specifically to the individual evaluation means, which hysteresis means cause a delay in the change of the demand components in at least one direction of change, in particular exclusively in the direction of a damping force demand with a soft damping force characteristic.

The damping force characteristic can be controlled so that it is changed in discrete steps, e.g. by changing the damping resistance in stages, by activating or deactivating switch valves in one or more throttle paths of hydraulic vibration dampers which determine the damping force characteristic. However, the evaluation means can also be realized so that they supply control signals directly for a proportional valve, the opening cross section of which determines the damping force characteristic. In this manner, an essentially uniform change in the damping force characteristic can be achieved.

One feature of the invention resides broadly in an apparatus for controlling a chassis vibration damping device in a vehicle chassis, a chassis vibration damping device having a variable vibration damping characteristic, the apparatus comprising: a measurement device; the measurement device comprising an acceleration sensor; the acceleration sensor comprising element for providing a measurement signal having an instantaneous value of the acceleration magnitude and direction, which measurement signal being a composite of accelerations in a longitudinal axis of movement extending in a direction between a front and back of a vehicle, a transverse axis of movement extending in a direction between two sides of a vehicle, and a vertical axis of movement extending in a direction between a bottom and top of a vehicle; the acceleration sensor having a plane of measurment, the measurment of the acceleration magnitude and direction being in the measurment plane; the measurment plane of the accaleration sensor being disposed at an angle to the axes of movement; an evaluation device; the evaluation device comprising element for determining a chassis vibration damping requirement variable as a function of the measurement signal; the evaluation device comprising element for separating the measurement signal into a fist signal representing the acceleration in the direction of the vertical axis and a second signal representing a combined acceleration in the direction of both the longitudinal axis and the transverse axis; a primary detector independent of the acceleration sensor; the primary detector comprising element for detecting a direction of the movement of the vehicle and element for transmitting a movement direction signal to the evalution device; the evaluation device comprising element for deriving a third signal and a fourth signal from the second signal and the movement direction signal; the third signal representing the acceleration in the direction of the longitudinal axis; the fourth signal representing the acceleration in the direction of the transverse axis; the evaluation device comprising element for converting the third signal into a longitudinal axis damping requirement signal; the evaluation device comprising element for converting the fourth signal into a transverse axis damping requirement signal; the evaluation device comprising element for converting the first signal into a vertical axis damping requirement signal; the evaluation element comprising element for summing the three damping requirement signals to form a control signal, the control signal defining the chassis vibration damping characteristic, the control signal for controlling an actuator of a chassis vibration damping device and setting a vibration damping characteristic of a chassis vibration damping device as a function of a chassis vibration damping requirement variable.

Another feature of the invention resides broadly in a vehicle chassis, a chassis vibration damping device having a variable vibration damping characteristic, the apparatus comprising: a measurement device; the measurement device comprising an acceleration sensor; the acceleration sensor comprising element for providing a measurement signal having an instantaneous value of the acceleration magnitude and direction, which measurement signal being a composite of accelerations in a longitudinal axis of movement extending in a direction between a front and back of a vehicle, a transverse axis of movement extending in a direction between two sides of a vehicle, and a vertical axis of movement extending in a direction between a bottom and top of a vehicle.

Yet another feature of the invention resides broadly in an apparatus for controlling a chassis vibration damping device in a vehicle chassis, a chassis vibration damping device having a variable vibration damping characteristic, the apparatus comprising: a measurement device; the measurement device comprising an acceleration sensor; the acceleration sensor comprising element for providing a measurement signal having an instantaneous value of the acceleration magnitude and direction, which measurement signal being a composite of an acceleration in a vertical axis of movement extending in a direction between a bottom and top of a vehicle, and at least one of: an acceleration in a longitudinal axis of movement extending in a direction between a front and back of a vehicle; and an acceleration in a transverse axis of movement extending in a direction between two sides of a vehicle; the apparatus comprises an evaluation device; the evaluation device comprising element for determining a chassis vibration damping requirement variable as a function of the measurement signal; the evaluation device comprising element for separating the measurement signal into a first signal representing the acceleration in the direction of the vertical axis and a second signal representing an acceleration in the direction of at least one of: the longitudinal axis; and the transverse axis.

BRIEF DESCRIPTION OF THE DRAWINGS

One embodiment of the invention is described in greater detail below with reference to the accompanying drawings.

DESCRIPTION OF THE PREFERRED EMBODIMENT

Figure 1:
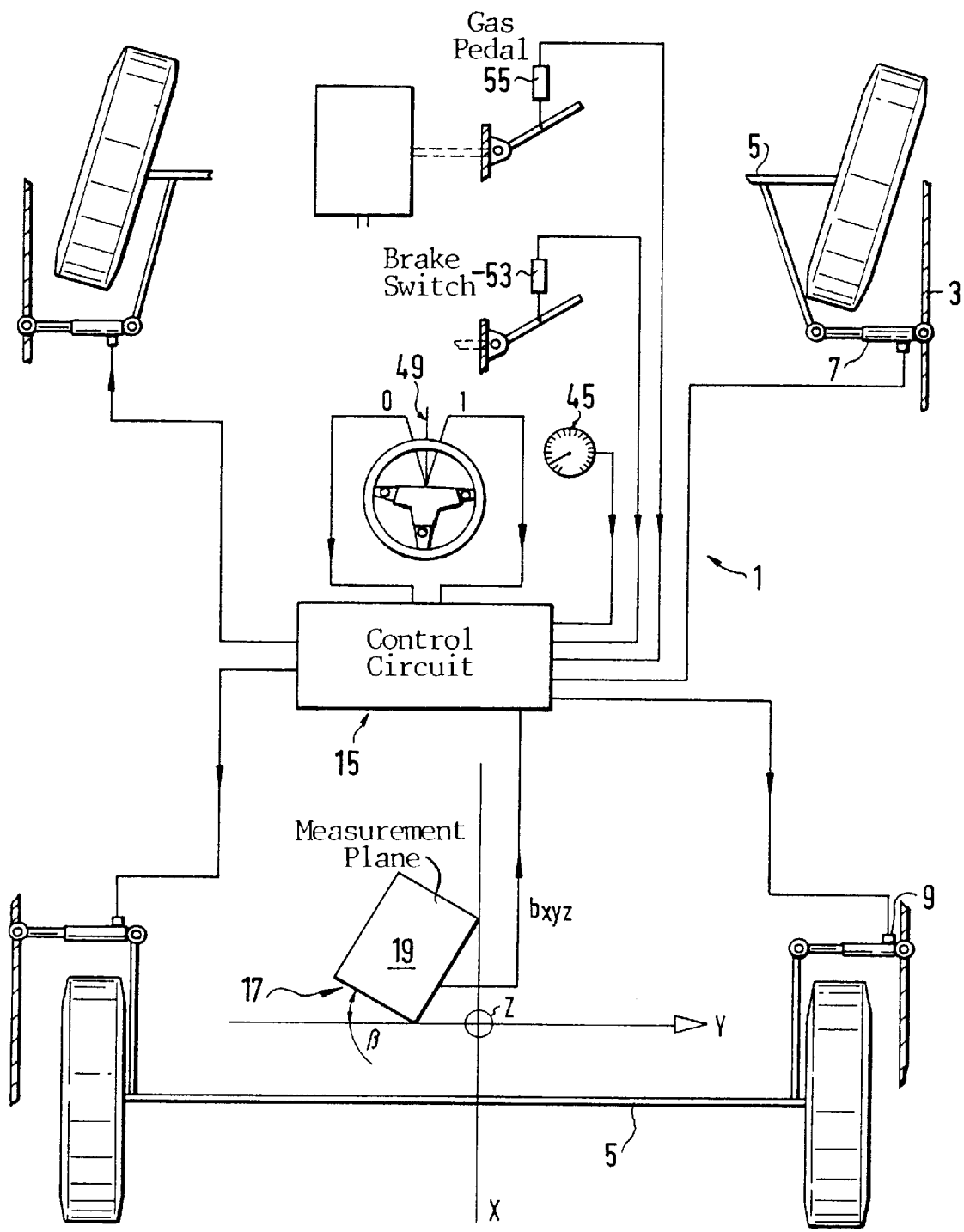
FIG. 1 shows a system for controlling a chassis.

FIG. 1 is a schematic illustration of a motor vehicle 1, in which a vehicle superstructure indicated as 3 is mounted by means of a suspension and vibration damper system on a multi-axle chassis indicated as 5. The suspension and vibration damper system comprises vibration dampers 7 which correspond to the individual wheels. Each vibration damper 7 is an "adaptive" hydraulic vibration damper which has a variable damping force characteristic. For this purpose, the vibration damper 7 has an actuator device 9 which modifies the damping resistance of the vibration damper 7 by means of one or more valves. For this purpose, each valve controlled by the actuator device can be connected in parallel or in series to a hydraulic circuit of the vibration damper 7 to restrict the damping force. The valve in question is appropriately a proportional valve, the degree of opening of which simultaneously defines the flow cross section of the hydraulic circuit. It goes without saying that separate valves which can be switched between two switch positions can also be provided, in connection with additional throttle openings. Instead of "adaptive" vibration dampers, however, "active" vibration dampers can also be used, in which the actuator device influences the variable fluid pressure, in particular the hydraulic pressure, which is supplied by external hydraulic pressure source, or in which the actuator device can influence the damping characteristics of properties of the damping fluid.

The actuator 9 of the vibration damper 7, depending on whether it modifies the damping force characteristic in discrete stages or is continuously variable, is varied by means of a control signal which can be modified in stages or switched between different signals, or by a control signal which can be varied continuously. The latter version of the control signal is particularly suitable for the control of a proportional valve, in which case the magnitude of the control signal adjusts the damping force characteristic continuously.

Figure 3:
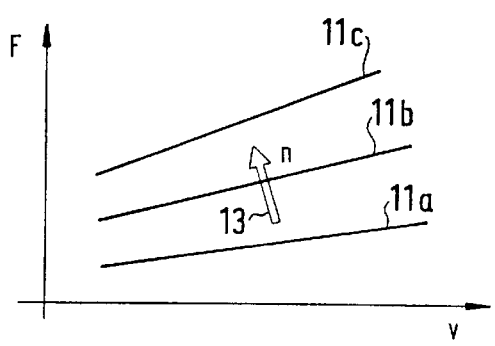
FIG. 3 is a diagram of a group of damping force characteristic lines of a vibration damper.

FIG. 3 shows, using the example of a characteristic field with a plurality of—in this embodiment three—damping force characteristics 11a, 11b, 11c, which illustrate the dependence of a damping force F as a function of an adjustment velocity v with which the basic components—a cylinder and a piston/piston rod assembly—move relative to one another. An arrow 13 indicates direction of change of a control signal n, the amplitude of which can be used to select the damping force characteristic. On a comparatively low damping force level, the damping force characteristic 11a represents a "soft" damping force characteristic which changes only slightly as a function of the damping velocity v. On a higher damping force level, a damping force characteristic 11c represents a "hard" damping force characteristic which increases sharply as a function of the damping velocity v. The damping force characteristic 11b represents a "medium" damping force characteristic. The actuation of the soft damping force characteristic 11a achieves increased ride comfort, while the hard damping force characteristic 11c improves the handling of the ride, albeit at the expense of the ride comfort.

The actuator 9 in FIG. 1 is controlled by a control circuit 15 (FIGS. 2a–b) which generates the control signal n. A separate control circuit can be provided for each individual vibration damper 7, or for subgroups of vibration dampers 7. The control circuit 15, however, can also be common to all the vibration dampers 7 of the chassis 5. To generate the control signal n, the control circuit 15 (or each of the control circuits) responds to an individual acceleration sensor 17, the measurement plane 19 of which is at an angle β to the transverse spatial axis or the transverse axis of movement Y which is perpendicular to the longitudinal axis X, and the measurement plane 19 is at an angle γ to the vertical spatial axis or the axis of vertical movement Z which runs perpendicular to the longitudinal axis X and perpendicular to the transverse axis Y. The angle γ is preferably selected so that it equals 45°. The angle β with respect to the longitudinal axis of the vehicle can be practically any desired angle. Depending on the size of the angle, the influence of the longitudinal acceleration can be determined by means of the angle. That is, depending on the size of the angle β, the influence of the longitudinal acceleration can be determined by means of the angle γ. Similarly, depending on the size of the angle β, the influence of the longitudinal acceleration can be determined by means of the angle β. In a parallel system, only the transverse and vertical acceleration is available as a final signal. In other words, if the measurement plane 19 lies in the YZ plane, so that angles γ and β are each zero degrees, then the signal from the acceleration sensor 17 will represent the transverse and vertical acceleration. A calibration of the measurement plane is unnecessary. During installation, the vehicle is exposed to a standard oscillation, the output signals of which are determined for each measurement axis. A calibrated initial position can be simulated or emulated by corresponding correction factors for each signal component.

That is, although the exact angular position of the measurement plane 19 relative to the Y axis is not critical, upon installation of the control system, the components of the system must be capable of a calibration procedure. The calibration procedure provides the references for the adjustment of the axes signals, especially the X and Y axes, so that the resulting damping requirement signals are proportional to and correspond to the actual accelerations of the body of the vehicle.

The measurement signal supplied by the acceleration sensor 17 and representing the instantaneous value of the acceleration of the vehicle superstructure 3 thereby preferably contains acceleration components for the longitudinal axis of movement x, the transverse axis of movement y and the vertical axis of movement z.

Figure 2A:
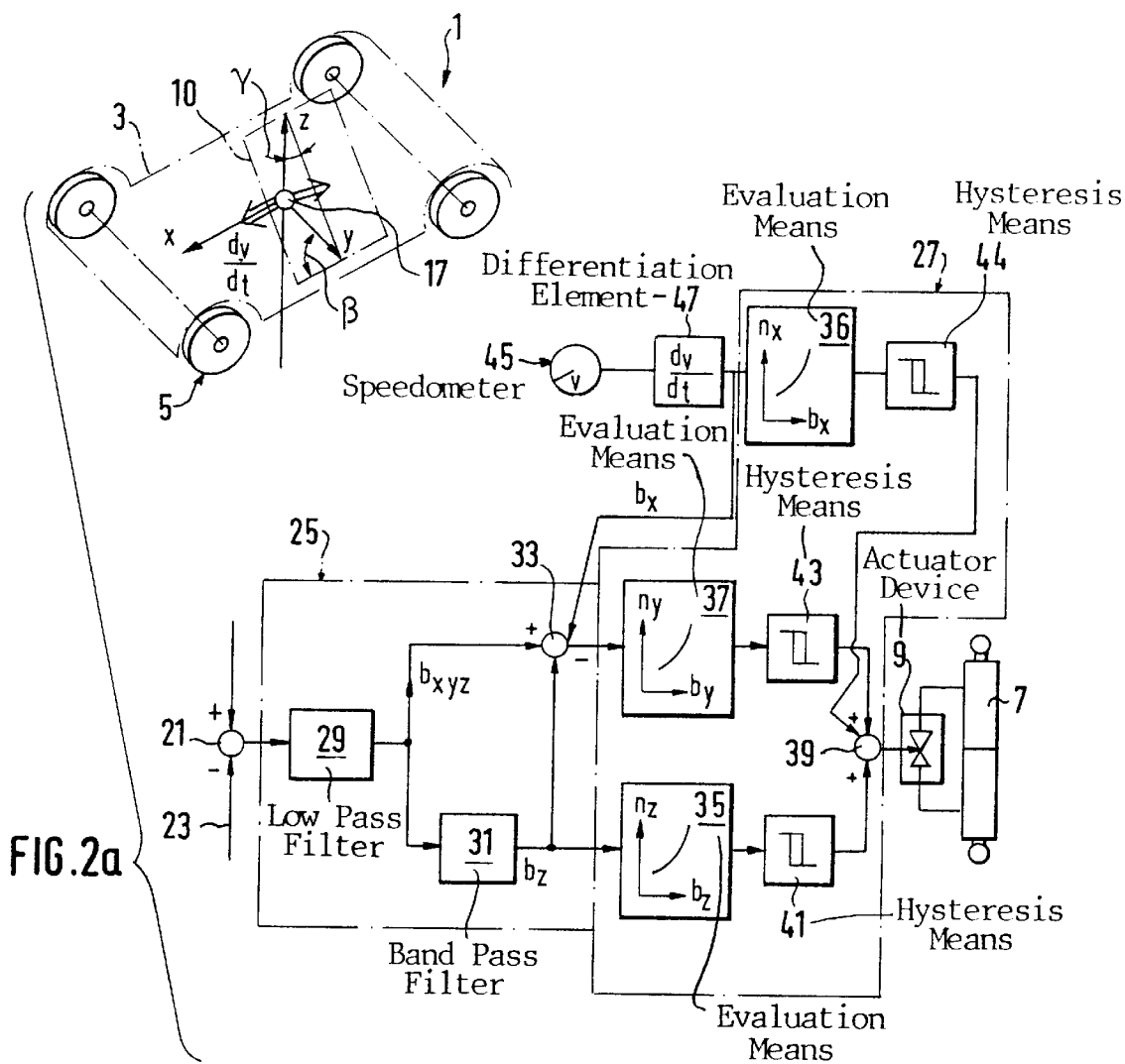
FIGS. 2a and 2b are block diagrams of a system for the control of a chassis which has a variable damping force characteristic.

The measurement signal of the acceleration sensor 17, as shown in FIG. 2a, is supplied by means of a differentiation stage 21, in which an offset signal fed in at 23 which compensates for the earth's gravity is subtracted, to signal separation means 25 of an evaluation device—designated 27 in general—of the control circuit 15. The signal separation means 25 comprise a low pass filter 29, whose cutoff frequency lies in the range of the natural frequency of the wheel of the motor vehicle, i.e. approximately 10 to 15 Hz. The offset-compensated measurement signal from the acceleration sensor 17, frequency-weighted or frequency limited by the low-pass filter 29, is fed to a band pass filter 31 of the signal separation means 25. The center frequency of the band pass filter 31 is approximately equal to the natural oscillation frequency of the vehicle superstructure 3 and can be, for example, approximately 1.5 to 2 Hz. The 3 dB bandwidth of the band pass filter 31 extends, for example, from 0.75 to 2.5 Hz. Since the vehicle superstructure 3, on account of the vehicle suspension, is capable primarily of oscillating in the direction of the vertical axis z, an output signal $b_z$ of the band pass filter 31 represents an acceleration component $b_z$ selectively assigned to the vertical axis z, of the output signal $b_{xyz}$ of the low pass filter 29 which represents the total acceleration in the measurement direction 19 (see FIG. 1).

The output signal $b_{xyz}$ consists of a magnitude and a direction, that is a vector. But it is not possible to unambiguously distinguish whether, for example, the vehicle is accelerating through a left-hand curve or decelerating through a right-hand curve. To make this distinction and/or to determine the direction of the vehicle acceleration, an additional signal is required. This additional signal can be provided by a variety of conceivable means, or a combination of them, to keep the system fully functional even in the event of a defect or malfunction.

In one variant embodiment, the acceleration in the direction of the longitudinal axis x of the vehicle is determined by a speedometer 45 in connection with a differentiation element 47. The speedometer is a standard component in any motor vehicle. The differentiation element 47 is basically also a standard component of every chassis control system, since the calculations inside the computer must be timed by a timing element (not shown). Consequently, the differentiation element 47 does not represent a separate component, but is already present in the computer software of the vehicle 1. At the output of the differentiation element 47 is a signal $b_x$, which is transmitted to a subtraction means 33. A directional component $b_y$ is determined from the signal $b_{xyz}$ at the subtraction means 33, using the components $b_x$ and $b_z$.

Figure 2B:
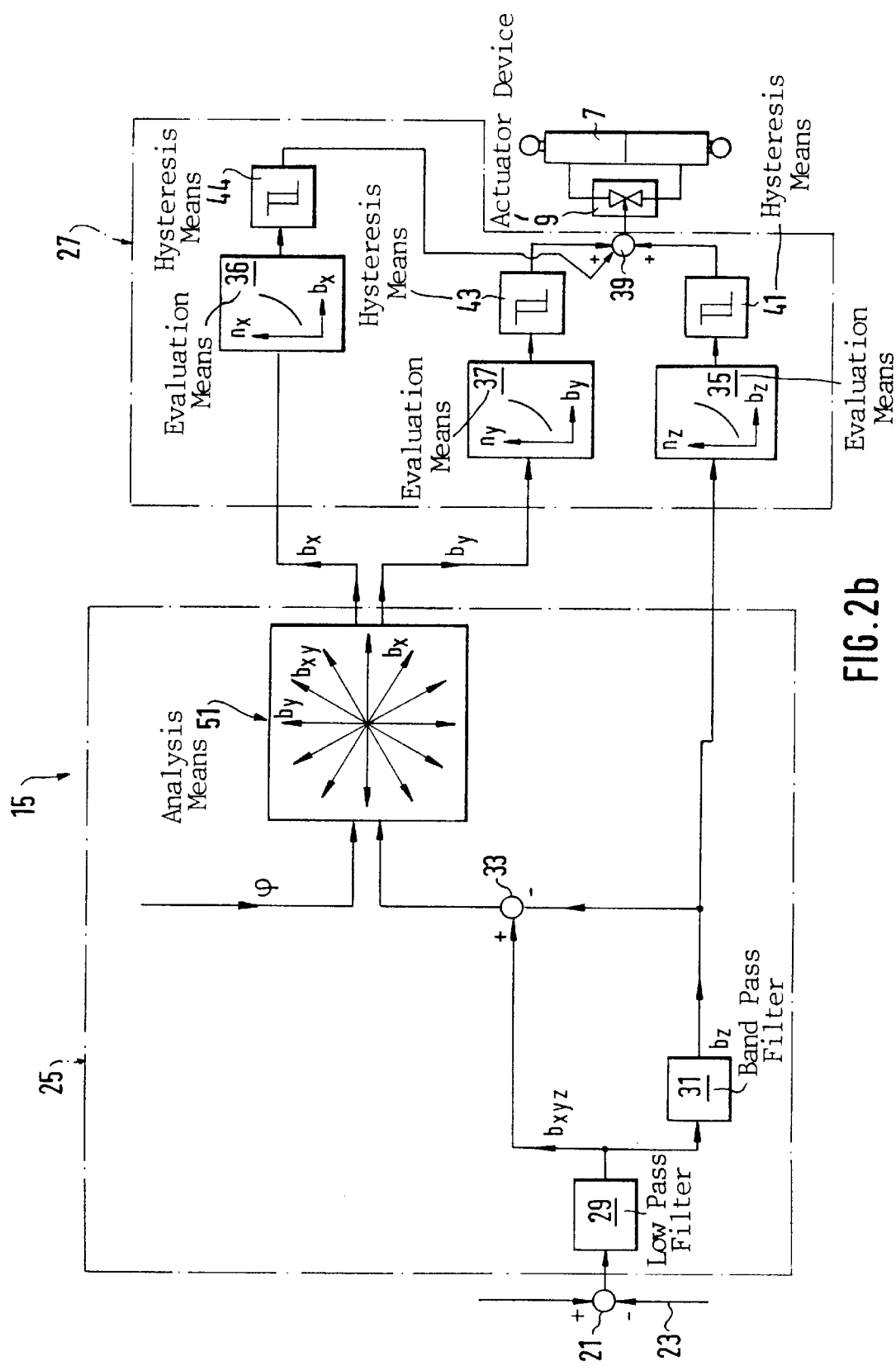

Basically, to break down the output signal $b_{xyz}$ it is not necessary to know the exact magnitude of the acceleration component $b_x$. It is altogether sufficient if the direction of movement is known. One possibility is to use an additional primary detector in the form of a steering angle switch 49 (see FIG. 1), which supplies only the signal variables 0 or 1 as the signal φ. For example, the signal variable 0 can stand for a left-hand curve, and the signal variable 1 can stand for a right-hand curve. Consequently, since the vector of the acceleration is known, from the signal $b_{xyz}$ from which the acceleration component $b_z$ is subtracted, and using the additional signal 0 or 1, it is possible to break down the signal $b_{xy}$ into its individual components $b_x$ and $b_y$ in an analysis means 51. FIG. 2b illustrates a system which uses this method. It is not absolutely necessary to use a steering angle switch 49 to provide the additional signal. Alternatively (see FIG. 1), a brake switch 53 or a similar switch on the gas pedal 55 can be used for the same purpose. A combination of two switches has the advantage that a mutual verification of the signal can be performed, or the correct operation of the system can be essentially guaranteed even in the event of the failure or malfunction of one of the primary detectors.

The rest of the description is identical for the systems illustrated in FIGS. 2a and 2b. The measurement signal components $b_z$ and $b_y$ and $b_x$ are used independently of one another in the evaluation device 27 by separate evaluation means 35, 37 and 36 respectively for the determination of a damping force demand component $n_z$ which results from the oscillation in the direction of the vertical axis z on one hand, and damping force components $n_x$, $n_y$ which result from oscillations in the plane of the longitudinal axis x and of the transverse axis y on the other hand. The evaluation means 35, 36, 37 are, for example, characteristic memories which make a correspondence between the damping force demand components $n_z$, $n_x$ and $n_y$ and the measurement signal components $b_z$ and $b_x$,$b_y$, e.g. in the form of tables. The characteristics or characteristic lines of the evaluation means 35, 36, 37 can be determined, for example, on the basis of practical tests to optimize vehicle handling or vehicle comfort. Summation means 39 of the evaluation direction device 27 add up the damping force demand components $n_z$, $n_y$, and $n_x$, to get the control signal n which represents the total damping force requirement.

To prevent excessive wear of the actuator device 9 as a result of too frequent shifting between different damping force characteristics, the summation means 39 are connected by means of separate hysteresis means 41, 43 and 44 respectively to the evaluation means 35, 36, 37. The hysteresis means 41, 43, 44 perform a "temporal" or time related hysteresis, by delaying the transmission of a change of the damping force demand components to the summation means 39 more in one direction of change, by a defined interval of time, than in the other direction of change. The damping force demand component is then delayed by a specified interval of time if it signals a damping force change from "hard" to "soft", that is toward increased ride comfort. If the damping force demand component signals a change toward a harder damping force characteristic, that is in the direction of improved ride handling, the damping force demand component is appropriately transmitted to the summation means 39 without an additional delay. Since the evaluation means 35, 36, 37 correspond to separate hysteresis means 41, 43, 44, the above-mentioned "temporal" hysteresis can be optimized. It goes without saying that instead of the hysteresis means 41, 43, 44, the evaluation means 27 can also have common hysteresis means, for example at the output of the summation means 39. The hysteresis means 41, 43, 44 appropriately respond when specified thresholds are exceeded as a result of changes in the damping force demand components. The thresholds can be of different magnitudes in the two directions of change of the damping force demand components. In particular, the threshold for the shift toward a "harder" damping force characteristic can be lower than in the opposite direction of the change.

Figure 4:
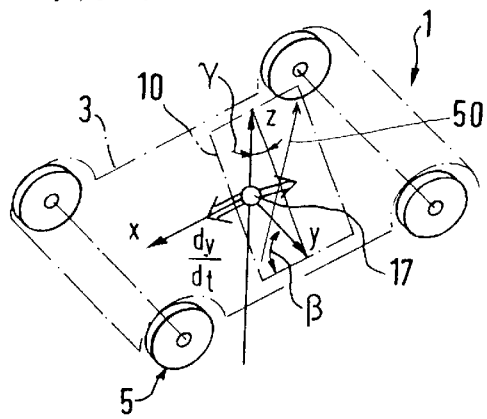
FIG. 4 shows an acceleration sensor represented as a vector.

FIG. 4 shows the acceleration sensor 17 mounted on the superstructure or body 3 of a vehicle 1. Within the measurement plane 19 of the acceleration sensor 17 a vector 50 is shown extending in a direction between two opposite corners of the measurement plane 19. The vector 50 is an alternative representation of the direction in which the acceleration sensor measures, which measurement direction has been represented by a measurement plane 19, as presented herein above. The vector 50 emphasizes that the magnitude and direction measured by the acceleration sensor preferably have components in the three axes, X, Y, and Z, of the vehicle 1.

One feature of the invention resides broadly in a system or apparatus for the control of a chassis vibration damping device with a variable damping characteristic in a vehicle, comprising: an axis of movement x which runs in the longitudinal direction of the vehicle, an axis of movement y which runs in the transverse direction of the vehicle, and an axis of movement z which runs in the vertical direction of the vehicle, a measurement device which comprises an acceleration sensor, an evaluation device which determines a chassis demand variable as a function of the instantaneous value measured, and an actuator which can set the characteristic of the chassis device as a function of the chassis demand or requirement variable determined, characterized by the fact that the acceleration sensor 17 on the vehicle 1 is located with its measurement plane 19 at an angle β, γ to the axes of movement, and provides an instantaneous value of the vehicle acceleration in terms of magnitude and vectoral direction, that the evaluation device 27 comprises signal separation means 25 which are located in the signal path of the measurement signal and which respond selectively to a natural oscillation frequency of the first axis of movement z, which signal separation means 25 separate the measurement signal into a measurement signal component $b_z$ which represents the instantaneous value of the acceleration variable in the direction of one of the first axes of movement z, and a measurement signal component $b_{xy}$ in a vehicle plane spanned by the longitudinal axis and the transverse axis of the vehicle, that from a primary detector 45; 49; 53; 55 there is an additional signal φ which is independent of the acceleration sensor, and which describes a vectoral direction of the vehicle movement, that the signal which describes the vectoral direction is transmitted to the evaluation device 27, so that the measurement signal component $b_{xy}$ is present in the form of a vector, that at the end of a vector analysis of the measurement signal component $b_{xy}$, the measurement signal components $b_x$; $b_y$ are available, that the evaluation device 27 comprises the evaluation means 35; 36; 37 corresponding to the measurement signal components $b_x$; $b_y$; $b_z$, which evaluation means generate demand components $n_x$; $n_y$; $n_z$ of the vehicle demand variable as a function of the measurement signal components $b_x$; $b_y$; $b_z$, that the evaluation device 27 comprises summation means 39 which sum the demand components $n_x$; $n_y$; $n_z$ to form a control signal which defines the chassis damping characteristic.

Another feature of the invention resides broadly in the system characterized by the fact that the signal separation means 25 for the separation of the first measurement signal component $b_z$ comprise a filter tuned to the natural oscillation frequency, in particular a band pass filter 31 with a center frequency tuned to the natural oscillation frequency, and subtraction means 33 for the formation of the remaining signal $b_{xy}$, which subtraction means subtract each measurement signal component $b_z$ from the remaining signal.

Yet another feature of the invention resides broadly in the system characterized by the fact that the additional primary detector is realized in the form of a steering angle switch or circuit 49.

Still another feature of the invention resides broadly in the system characterized by the fact that the additional primary detector is realized in the form of a brake switch or circuit 53.

A further feature of the invention resides broadly in the system characterized by the fact that the additional primary detector is in the form of a tachometer 45 in connection with a differentiating circuit 47.

Another feature of the invention resides broadly in the system characterized by the fact that the evaluation means 35, 36, 37 which correspond to the individual measurement signal components $b_z$, $b_y$, $b_x$ and which generate the demand variables are realized in the form of characteristic graph memories.

Yet another feature of the invention resides broadly in the system characterized by the fact that the angle γ of the acceleration sensor 17 between the transverse axis of movement y and the vertical axis of movement z is approximately 45 degrees.

Still another feature of the invention resides broadly in the system characterized by the fact that the measurement signal components $b_y$, $b_x$ and the corresponding evaluation means 26, 37 are sized so that the acceleration of the vehicle superstructure or body 3 in the direction of the longitudinal axis of movement x and in the direction of the transverse axis of movement y have essentially the same influence on the demand components $n_y$, $n_x$.

A further feature of the invention resides broadly in the system characterized by the fact that located upstream of the signal separation means 25 is a low pass filter 29 which allows the natural oscillation frequency of a vehicle superstructure 3 of the vehicle 1 to pass, but blocks the natural oscillation frequency of the wheels 5 of the chassis.

Another feature of the invention resides broadly in the system characterized by the fact that the evaluation device 27 comprises a hysteresis device 41, 43, 49 to restrict the frequency with which a damping force characteristic can be modified, which hysteresis device delays a modification of the damping force characteristic in at least one of two directions of change which are opposite to one another, in particular in the event of a change from a harder damping force characteristic to a softer damping force characteristic.

Yet another feature of the invention resides broadly in the system characterized by the fact that an actuator 9 to set a damping force characteristic of hydraulic chassis vibration dampers has at least one proportional valve, the opening cross section of which can be set or adjusted proportional to the control signal.

Examples of acceleration sensor arrangements, which may possibly be utilized in accordance with the embodiments of the present invention, may be found in the following U.S. Pat. No. 4,898,033, which issued to Yamamoto on Dec. 6, 1990; No. 4,903,982, which issued to Harara et al. on Feb. 27, 1990; No. 4,927,170, which issued to Wada on May 22, 1990; No. 4,930,082, which issued to Harara et al. on May 29, 1990; and No. 4,948,164, which issued to Hano et al. on Aug. 14, 1990.

Examples of bandpass filters, which may possibly be utilized in accordance with the embodiments of the present invention, may be found in the following U.S. Pat. No. 5,019,792, which issued to DiBiase et al. on May 28, 1991; No. 5,028,894, which issued to Speake on Jul. 2, 1991; No. 5,065,453, which issued to Thomas on Nov. 12, 1991; No. 5,101,182, which issued to Babbitt et al. on Mar. 31, 1992.

Examples of lowpass filters, which may possibly be utilized in accordance with the embodiments of the present invention, may be found in the following U.S. Pat. No. 5,023,579, which issued to Bentivenga and Bentivenga on Jun. 11, 1991; No. 5,032,909, which issued to Sato et al. on Jul. 16, 1991; No. 5,119,321, which issued to Burton et al. on Jun. 2, 1992; and No. 5,155,743, which issued to Jacobs on Oct. 13, 1992.

Examples of hysteresis arrangements, which may possibly be utilized in accordance with the embodiments of the present invention, may be found in the following U.S. Pat. No. 4,903,813, which issued to Maki on Feb. 27, 1990; No. 4,932,921, which issued to Kobayashi et al. on Jun. 12, 1990; No. 5,065,462, which issued to Kagiyama et al. on Nov. 19, 1991; No. 4,947,706, which issued to Umeyama et al. on Aug. 14, 1990; No. 5,103,396, which issued to Hiwatashi et al. on Apr. 7, 1992; No. 4,965,475, which issued to Kautz on Oct. 23, 1990.

Examples of proportional valve arrangements, which may possibly be utilized in accordance with the embodiments of the present invention, may be found in the following U.S. Pat. No. 4,948,165, which issued to Takahashi et al. on Aug. 14, 1990; No. 5,042,832, which issued to Takahashi et al. on Aug. 27, 1991; No. 4,991,491, which issued to Neumann on Feb. 12, 1991.

Examples of lookup table arrangements and related arrangements, which may possibly be utilized in accordance with the embodiments of the present invention, may be found in the following U.S. Pat. No. 4,893,234, which issued to Davidson et al. on Jan. 9, 1990; No. 4,920,496, which issued to Szczebak, Jr., on Apr. 24, 1990; No. 4,968,985, which issued to Riggle et al. on Nov. 6, 1990; No. 4,974,078, which issued to Tsai on Nov. 27, 1990.

General examples of components, relating to apparatus for the control of vibration dampers, which may possibly be utilized in accordance with the embodiments of the present invention, may be found in the following U.S. Pat. No.

4,872,701, which issued to Akatsu et al. in October 1989; No. 4,869,528 to Buma et al., which issued to Buma et al. in September 1989; No. 4,865,347, which issued to Fukushima et al. in September 1989; No. 4,853,860, which issued to Achenbach in August 1989; No. 4,827,416, which issued to Kawagoe et al. in May 1989; No. 4,765,648, which issued to Mander et al. in August 1988; No. 4,669,749, which issued to Tanaka et al. in June 1987; and No. 4,664,409, which issued to Nakashima et al. in May 1987.

Some examples of systems in which embodiments of the present invention could possibly be used are: U.S. Pat. No. 5,228,719, entitled "Automotive Active Suspension System for Anti-Rolling Control"; U.S. Pat. No. 5,231,583 to Lizell, entitled "Method and Apparatus for Dynamic Leveling of a Vehicle Using an Active Suspension System"; U.S. Pat. No. 5,195,772 to Bachrach, Levitt, and Nametz, entitled "Valve Configuration for Converting an Active Suspension System Into a Passive Suspension System"; U.S. Pat. No. 5,183,127 entitled "Suspension-Traction Total Control System"; U.S. Pat. No. 5,208,749 entitled "Method for Controlling Active Suspension System on the Basis of Rotational Motion Model"; U.S. Pat. No. 5,299,488 to Kadlicko and Halina, entitled "Active Suspension System"; U.S. Pat. No. 5,322,319 entitled "Active Suspension Apparatus for a Vehicle"; U.S. Pat. No. 5,322,321 to Yopp, entitled "Vehicle Active Suspension System"; and U.S. Pat. No. 4,700,812 entitled "Vehicular Suspension System," issued to Moser.

Some types of automobile suspension systems that could possibly be utilized in conjunction with the present invention may be disclosed by the following U.S. Pat. No. 5,178,406 to Reynolds, entitled "Torsion Bar Suspension"; U.S. Pat. No. 5,286,059 to Tabe, entitled "Height Control System when Vehicle Is Jacked Up"; U.S. Pat. No. 5,288,101 to Minnett, entitled "Variable Rate Torsion Control System for Vehicle Suspension"; and U.S. Pat. No. 5,290,048 to Takahashi and Yamashita, entitled "Working Fluid Circuit for Active Suspension Control System of Vehicle".

Some other examples of systems that could possibly be used in conjunction with the present invention may be or are disclosed by the following U.S. Pat. No. 5,251,728 to Mund et al., entitled "Hydraulic Vibration Damper or Shock Absorber with Electrical Connector Therefor"; U.S. Pat. No. 4,785,920 to Knecht et al., entitled "Hydraulic Adjustable Shock Absorber"; U.S. Pat. No. 4,719,800 to Moser, entitled "Accelerometer"; U.S. Pat. No. 4,989,148 to Gürke et al., entitled "Apparatus for the Computer-Assisted Control of Vibration Dampers of a Vehicular Suspension System as a Function of the Roadway"; U.S. Pat. No. 4,749,070 to Moser et al., entitled "Hydraulic Vibration Damper Having Adjustable Damping Valve".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 195 39 566.2, filed on Oct. 25, 1995, having inventors Udo Borschert and Thomas Kutsche, and DE-OS 195 39 566.2 and DE-PS 195 39 566.2, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. An apparatus for controlling a chassis vibration damping device in a vehicle chassis, a chassis vibration damping device having a variable vibration damping characteristic, said apparatus comprising:

a measurement device;

said measurement device comprising an acceleration sensor;

said acceleration sensor comprising means for providing a measurement signal having an instantaneous value of the acceleration magnitude and direction, which measurement signal being a composite of accelerations in a longitudinal axis of movement extending in a direction between a front and back of a vehicle, a transverse axis of movement extending in a direction between two sides of a vehicle, and a vertical axis of movement extending in a direction between a bottom and top of a vehicle;

an evaluation device;

said evaluation device comprising means for determining a chassis vibration damping requirement variable as a function of the measurement signal;

said evaluation device comprising means for separating the measurement signal into a first signal representing the acceleration in the direction of the vertical axis and a second signal representing a combined acceleration in the direction of both the longitudinal axis and the transverse axis;

a primary detector independent of said acceleration sensor;

said primary detector comprising means for detecting a direction of movement of the vehicle and means for transmitting a movement direction signal to said evaluation device;

said evaluation device comprising means for deriving a third signal and a fourth signal from the second signal and the movement direction signal;

the third signal representing the acceleration in the direction of the longitudinal axis; and the fourth signal representing the acceleration in the direction of the transverse axis.

2. The apparatus of claim 1, wherein:

said evaluation device comprises means for converting the third signal into a longitudinal axis damping requirement signal;

said evaluation device comprises means for converting the fourth signal into a transverse axis damping requirement signal;

said evaluation device comprises means for converting the first signal into a vertical axis damping requirement signal; and said evaluation device comprises means for summing the three damping requirement signals to form a control signal, the control signal defining the chassis vibration damping characteristic, the control signal for controlling an actuator of a chassis vibration damping device and setting a vibration damping characteristic of a chassis vibration damping device as a function of a chassis vibration damping requirement variable.

3. The apparatus of claim 2, wherein:

said signal separation means comprises means for corresponding to a natural oscillation frequency of a vehicle in the vertical axis direction;

said signal separation means comprises a filter tuned to the natural oscillation frequency of a vehicle in the vertical axis direction;

said filter comprises a band pass filter with a center frequency tuned to the natural oscillation frequency of a vehicle in the vertical axis direction; and said signal separation means comprises means for subtracting the first signal from the measurement signal to produce the second signal.

4. The apparatus of claim 3, wherein:

said primary detector comprises at least one of:
a steering angle switch;
a brake switch; and
a speedometer and a differentiating circuit.

5. The apparatus of claim 4, wherein:

said means for determining a chassis vibration damping requirement variable comprises means for determining a chassis vibration damping requirement variable corresponding to each of the first signal, third signal, and fourth signal;

said means for determining a chassis vibration damping requirement variable corresponding to each of the first signal, third signal, and fourth signal comprises a characteristic graph memory;

said means for providing a measurement signal having an instantaneous value of the acceleration magnitude and direction comprises means for aligning the direction of measurement at an angle of substantially forty five degrees with respect to the vertical axis;

said evaluation device comprises means for removing a natural oscillation frequency of wheels of a vehicle from the measurement signal;

said removing means comprises a low pass filter disposed between said acceleration sensor and said separating means;

said evaluation device comprises means for restricting the frequency of change in at least one of:
the longitudinal axis damping requirement signal;
the transverse axis damping requirement signal; and
the vertical axis damping requirement signal;

said restricting means comprises means for restricting the frequency of change from a harder damping requirement to a softer damping requirement;

said restricting means comprises a hysteresis device;

said apparatus further comprises an actuator for controlling a proportional valve on a hydraulic damper; and said actuator comprises means for controlling an opening cross section of a proportional valve in response to the control signal.

6. An apparatus for controlling a chassis vibration damping device in a vehicle chassis, a chassis vibration damping device having a variable vibration damping characteristic, said apparatus comprising:

a measurement device;

said measurement device comprising an acceleration sensor;

said acceleration sensor comprising means for providing a measurement signal having an instantaneous value of the acceleration magnitude and direction, which measurement signal being a composite of accelerations in a longitudinal axis of movement extending in a direction between a front and back of a vehicle, a transverse axis of movement extending in a direction between two sides of a vehicle, and a vertical axis of movement extending in a direction between a bottom and top of a vehicle;

said acceleration sensor having a plane of measurement, the measurement of the acceleration magnitude and direction being in the measurement plane;

the measurement plane of said acceleration sensor being disposed at an angle to the axes of movement;

an evaluation device;

said evaluation device comprising means for determining a chassis vibration damping requirement variable as a function of the measurement signal;

said evaluation device comprising means for separating the measurement signal into a first signal representing the acceleration in the direction of the vertical axis and a second signal representing a combined acceleration in the direction of both the longitudinal axis and the transverse axis;

a primary detector independent of said acceleration sensor;

said primary detector comprising means for detecting a direction of movement of the vehicle and means for transmitting a movement direction signal to said evaluation device;

said evaluation device comprising means for deriving a third signal and a fourth signal from the second signal and the movement direction signal;

the third signal representing the acceleration in the direction of the longitudinal axis;

the fourth signal representing the acceleration in the direction of the transverse axis;

said evaluation device comprising means for converting the third signal into a longitudinal axis damping requirement signal;

said evaluation device comprising means for converting the fourth signal into a transverse axis damping requirement signal;

said evaluation device comprising means for converting the first signal into a vertical axis damping requirement signal; and said evaluation device comprising means for summing the three damping requirement signals to form a control signal, the control signal defining the chassis vibration damping characteristic, the control signal for controlling an actuator of a chassis vibration damping device and setting a vibration damping characteristic of a chassis vibration damping device as a function of a chassis vibration damping requirement variable.

7. The apparatus of claim 6, wherein:

said signal separation means comprises means for corresponding to a natural oscillation frequency of a vehicle in the vertical axis direction.

8. The apparatus of claim 7, wherein:

said signal separation means comprises a filter tuned to the natural oscillation frequency of a vehicle in the vertical axis direction;

said filter comprises a band pass filter with a center frequency tuned to the natural oscillation frequency of a vehicle in the vertical axis direction; and said signal separation means comprises means for subtracting the first signal from the measurement signal to produce the second signal.

9. The apparatus of claim 8, wherein:

said means for determining a chassis vibration damping requirement variable comprises means for determining a chassis vibration damping requirement variable corresponding to each of the first signal, third signal, and fourth signal; and said means for determining a chassis vibration damping requirement variable corresponding to each of the first signal, third signal, and fourth signal comprises a characteristic graph memory.

10. The apparatus of claim 9, wherein:

said evaluation device comprises means for removing a natural oscillation frequency of wheels of a vehicle from the measurement signal; and said removing means comprises a low pass filter disposed between said acceleration sensor and said separating means.

11. The apparatus of claim 10, wherein:

said evaluation device comprises means for restricting the frequency of change in at least one of:
the longitudinal axis damping requirement signal;
the transverse axis damping requirement signal; and
the vertical axis damping requirement signal;

said restricting means comprises means for restricting the frequency of change from a harder damping requirement to a softer damping requirement; and said restricting means comprises a hysteresis device.

12. The apparatus of claim 11, wherein:

said apparatus further comprises an actuator for controlling a proportional valve on a hydraulic damper; and said actuator comprises means for controlling an opening cross section of a proportional valve in response to the control signal.

13. The apparatus of claim 6, wherein:
said primary detector comprises a steering angle switch.

14. The apparatus of claim 6, wherein:
said primary detector comprises a brake switch.

15. The apparatus of claim 6, wherein:
said primary detector comprises a speedometer and a differentiating circuit.

16. The apparatus of claim 6, wherein:
the measurement plane of said acceleration sensor is disposed at an angle of substantially forty five degrees with respect to the vertical axis.

17. The apparatus of claim 6, wherein:

said means for converting the third signal into a longitudinal axis damping requirement signal and said means for converting the fourth signal into a transverse axis damping requirement signal comprise means for maintaining said longitudinal axis damping requirement signal and said transverse axis requirement signal proportional to a longitudinal axis vehicle body acceleration and a transverse axis vehicle body acceleration respectively.

18. An apparatus for controlling a chassis vibration damping device in a vehicle chassis, a chassis vibration damping device having a variable vibration damping characteristic, said apparatus comprising:

a measurement device;

said measurement device comprising an acceleration sensor;

said acceleration sensor comprising means for providing a measurement signal having an instantaneous value of the acceleration magnitude and direction, which measurement signal being a composite of an acceleration in a vertical axis of movement extending in a direction between a bottom and top of a vehicle, and at least one of:
an acceleration in a longitudinal axis of movement extending in a direction between a front and back of a vehicle; and
an acceleration in a transverse axis of movement extending in a direction between two sides of a vehicle;

said apparatus comprising an evaluation device;

said evaluation device comprising means for determining a chassis vibration damping requirement variable as a function of the measurement signal;

said evaluation device comprising means for separating the measurement signal into a first signal representing the acceleration in the direction of the vertical axis and a second signal representing an acceleration in the direction of at least one of:
the longitudinal axis; and
the transverse axis;

a primary detector independent of said acceleration sensor;

said primary detector comprising means for detecting a direction of movement of the vehicle and means for transmitting a movement direction signal to said evaluation device;

said evaluation device comprising means for converting the first signal into a vertical axis damping requirement signal;

said evaluation device comprising means for converting the second signal into a damping requirement signal;

said evaluation device comprising means for summing the damping requirement signals to form a control signal, the control signal defining the chassis vibration damping characteristic, the control signal for controlling an actuator of a chassis vibration damping device and setting a vibration damping characteristic of a chassis vibration damping device as a function of a chassis vibration damping requirement variable;

said signal separation means comprising means for corresponding to a natural oscillation frequency of a vehicle in the vertical axis direction;

said signal separation means comprising a filter tuned to the natural oscillation frequency of a vehicle in the vertical axis direction;

said filter comprising a band pass filter with a center frequency tuned to the natural oscillation frequency of a vehicle in the vertical axis direction;

said signal separation means comprising means for subtracting the first signal from the measurement signal to produce the second signal;

said primary detector comprising at least one of:
a steering angle switch;
a brake switch; and
a speedometer and a differentiating circuit;

said means for determining a chassis vibration damping requirement variable comprising means for determining a chassis vibration damping requirement variable corresponding to each of the first signal and second signal;

said means for determining a chassis vibration damping requirement variable corresponding to each of the first signal and second signal comprising a characteristic graph memory;

said means for providing a measurement signal having an instantaneous value of the acceleration magnitude and direction comprising means for aligning the direction of measurement at an angle of substantially forty five degrees with respect to the vertical axis;

said evaluation device comprising means for removing a natural oscillation frequency of wheels of a vehicle from the measurement signal;

said removing means comprising a low pass filter disposed between said acceleration sensor and said separating means;

said evaluation device comprising means for restricting the frequency of change in at least one of:
the longitudinal axis damping requirement signal;
the transverse axis damping requirement signal; and
the vertical axis damping requirement signal;

said restricting means comprising means for restricting the frequency of change from a harder damping requirement to a softer damping requirement;

said restricting means comprising a hysteresis device;

an actuator for controlling a proportional valve on a hydraulic damper; and said actuator comprising means for controlling an opening cross section of a proportional valve in response to the control signal.

* * * * *

UNITED STATES PATENT AND TRADEMARK OFFICE
CERTIFICATE OF CORRECTION

PATENT NO. :     6,026,338
DATED      :     February 15, 2000
INVENTOR(S) :    Udo BORSCHERT and Thomas KUTSCHE It is certified that error appears in the above-indentified patent and that said Letters Patent is hereby corrected as shown below:

In column 2, line 57, after 'components', delete "nx;ny;nz" and insert --$n_x;n_y;n_z$--.

In column 5, line 52, after 'a', delete "fist" and insert --first--.

In column 6, line 13, after 'in' insert --an apparatus for controlling a chassis vibration damping device in--.

Signed and Sealed this

Twenty-seventh Day of February, 2001

Attest:

NICHOLAS P. GODICI

Attesting Officer    Acting Director of the United States Patent and Trademark Office